US012633716B2

(12) United States Patent
Kane et al.

(10) Patent No.: US 12,633,716 B2
(45) Date of Patent: May 19, 2026

(54) PIEZO-TUNED NONPLANAR RING OSCILLATOR WITH GHz TUNING RANGE AND 100 kHz BANDWIDTH

(71) Applicants: Thomas James Kane, Menlo Park, CA (US); Kenji Numata, Laurel, MD (US); John Lawrence Nightingale, Portola Valley, CA (US)

(72) Inventors: Thomas James Kane, Menlo Park, CA (US); Kenji Numata, Laurel, MD (US); John Lawrence Nightingale, Portola Valley, CA (US)

( * ) Notice: Subject to any disclaimer, the term of this patent is extended or adjusted under 35 U.S.C. 154(b) by 628 days.

(21) Appl. No.: 18/099,362

(22) Filed: Jan. 20, 2023

(65) Prior Publication Data

US 2023/0238764 A1 Jul. 27, 2023

Related U.S. Application Data

(60) Provisional application No. 63/302,019, filed on Jan. 21, 2022.

(51) Int. Cl.
| | |
|---|---|
| *H01S 3/06* | (2006.01) |
| *H01S 3/083* | (2006.01) |
| *H01S 3/10* | (2006.01) |

(52) U.S. Cl.
CPC ............ *H01S 3/083* (2013.01); *H01S 3/0627* (2013.01); *H01S 3/1003* (2013.01)

(58) Field of Classification Search
CPC ...... H01S 3/083; H01S 3/0627; H01S 3/1003; H01S 3/102; H01S 3/025; H01S 3/0405;
(Continued)

(56) References Cited

U.S. PATENT DOCUMENTS

| | | | | | |
|---|---|---|---|---|---|
| 4,578,793 | A | * | 3/1986 | Kane ...................... | H01S 3/083 |
| | | | | | 372/71 |
| 4,955,034 | A | * | 9/1990 | Scerbak ................ | H01S 3/0606 |
| | | | | | 372/100 |

(Continued)

OTHER PUBLICATIONS

W. R. Trunta, Jr. et al., Optics Letters, vol. 12, No. 4 p. 248 (1998).

(Continued)

*Primary Examiner* — Xinning(Tom) Niu

(57) ABSTRACT

A monolithic nonplanar ring oscillator (NPRO) laser with a large piezo-electric tuning range and high frequency slew rate, denoted as a μNPRO, is described. A tuning range of 3.5 GHz with 192 volts applied, corresponding to a tuning coefficient of 18.2 MHz/volt was experimentally demonstrated. This performance was achieved by making the solid-state gain element small, with a small distance between a piezo-electric element bonded to the solid-state gain element and a first lase plane in the solid-state gain element. The entire nonplanar ring lasing path within the solid-state gain element may lie within the half of the solid-state gain element closest to the bonded piezo-electric element. This large frequency modulation span and wide frequency modulation bandwidth, combined with unsurpassed coherence and high power, make this an attractive laser for frequency-modulated continuous-wave (FMCW) LIDAR.

20 Claims, 7 Drawing Sheets

(58) Field of Classification Search
CPC .. H01S 3/0615; H01S 3/08031; H01S 3/0816;
H01S 3/0606
See application file for complete search history.

(56) References Cited

U.S. PATENT DOCUMENTS

| | | | |
|---|---|---|---|
| 5,027,367 A * | 6/1991 | Rea, Jr. ................. | H01S 3/0606 |
| | | | 372/37 |
| 5,177,764 A * | 1/1993 | Nilsson ................... | H01S 3/083 |
| | | | 372/27 |
| 9,134,538 B1 * | 9/2015 | Augst ................... | H01S 5/4062 |
| 2017/0155225 A1 * | 6/2017 | Villeneuve .......... | H01S 3/06754 |
| 2020/0249317 A1 * | 8/2020 | Cao ......................... | G01S 17/08 |
| 2022/0190541 A1 * | 6/2022 | Renninger ............ | H01S 3/1303 |

OTHER PUBLICATIONS

Lumentum Inc. data sheet on Continuous-Wave (CW) Single-Frequency IR Laser, NPRO® 125/126 Series.

* cited by examiner

100
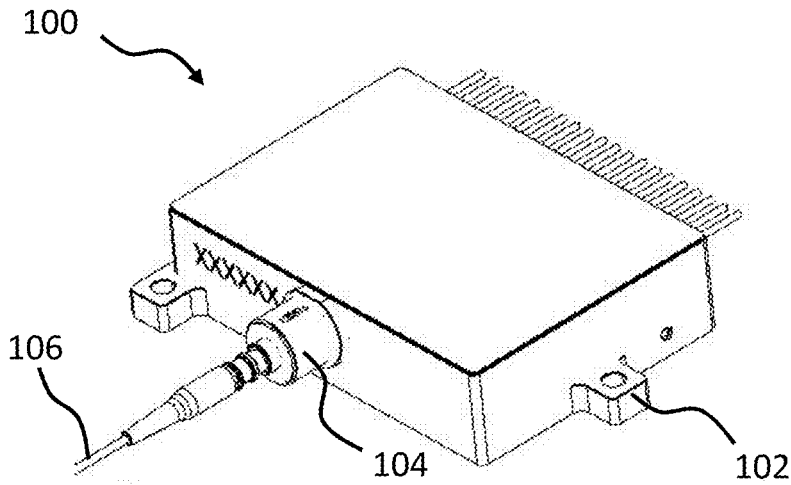
106
104
102
FIG. 1
116
110
112
108
108
114
118
FIG. 2A
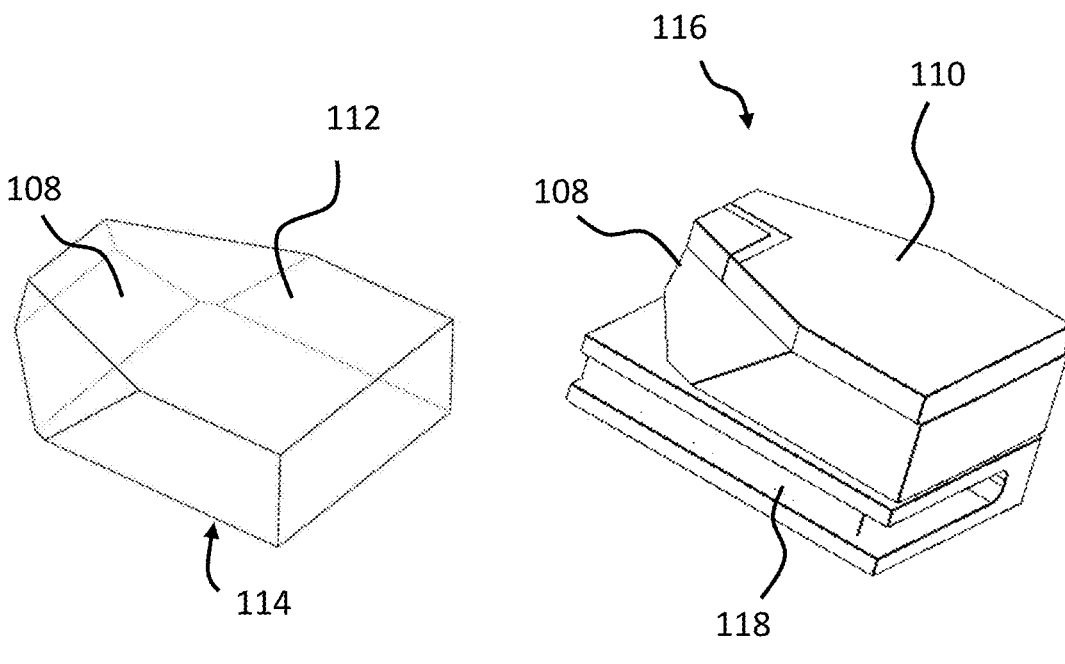
FIG. 2B

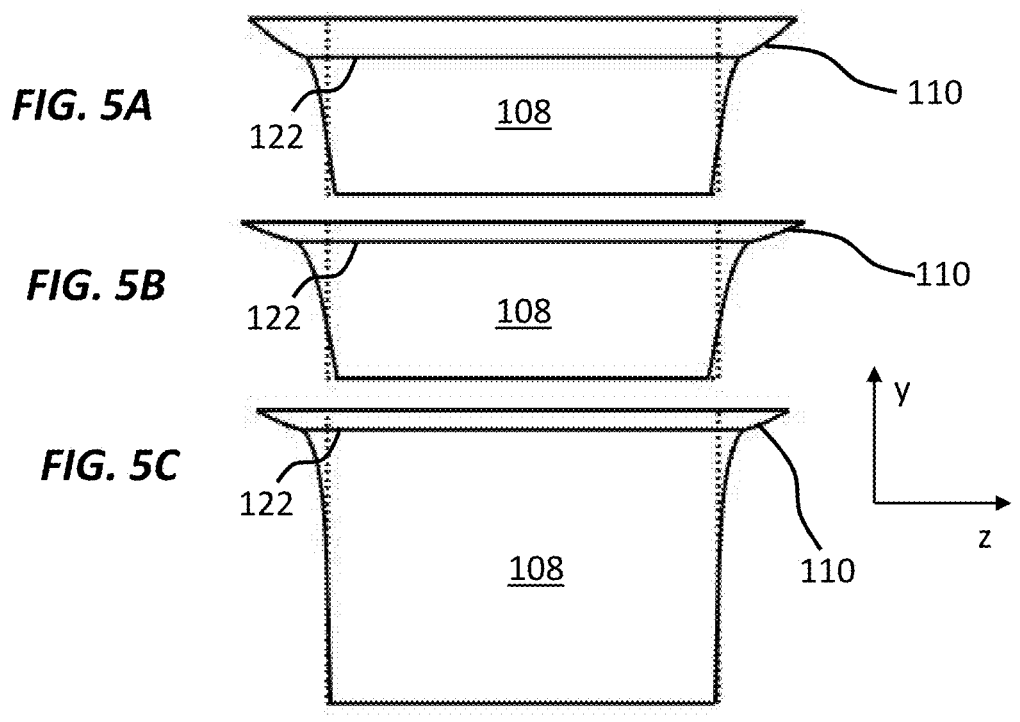
*FIG. 5A*
*FIG. 5B*
*FIG. 5C*
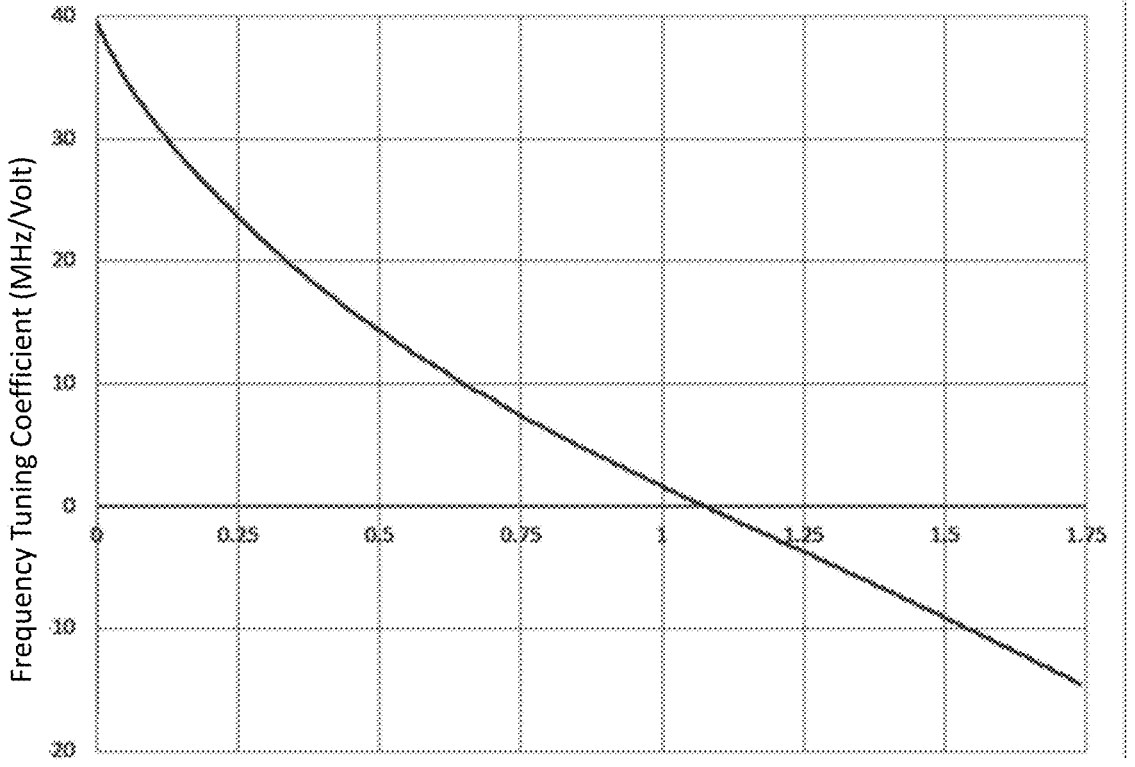
Distance between first lase plane and piezo-electric/gain element interface (mm)
*FIG. 6*

PIEZO-TUNED NONPLANAR RING OSCILLATOR WITH GHz TUNING RANGE AND 100 kHz BANDWIDTH

CROSS REFERENCE TO RELATED APPLICATIONS

This application claims priority to U.S. Provisional Patent Application Ser. No. 63/302,019, entitled "Piezo-tuned nonplanar ring oscillator with GHz range and 100 kHz bandwidth", filed Jan. 21, 2022 which is incorporated herein in its entirety for all purposes.

GOVERNMENT SUPPORT

This invention was made with government support under grant 80GSFC18C0120 awarded by the National Aeronautics and Space Administration. The US government has certain rights in the invention.

FIELD OF THE INVENTION

The present invention is a frequency tunable nonplanar ring oscillator (NPRO) laser with a high frequency slew rate and large frequency tuning range. The laser has applications in ranging and optical coherence tomography.

BACKGROUND

The nonplanar ring oscillator (NPRO), invented by Kane and Byer in 1984 and described in U.S. Pat. No. 4,578,793, sets the standard for narrow-linewidth single-frequency lasers. Single-frequency output at the several-hundred milliwatt level is commercially available at the two Nd:YAG (neodymium doped yttrium aluminum garnet) wavelengths of 1064 nm and 1319 nm. At 1064 nm, amplification can take power above 100 watts. Lasers based on a nonplanar ring oscillator (NPRO) design are critical elements in all laser interferometers used for gravitational wave detection.

The value of the NPRO is much enhanced by its convenient tunability. Thermal tuning provides multi-GHz tuning range and one-second response time. Strain tuning, accomplished using a piezo-electric element bonded to one of the non-optical surfaces of the NPRO, was invented by Kane in 1988 and is described in U.S. Pat. No. 4,829,532. Strain tuning has a response time of about one microsecond and as initially reported, a range of a few tens of megahertz. This is more than adequate to enable robust phase locking of NPROs.

NASA is supporting development of an NPRO for use as the laser oscillator for the Laser Interferometer Space Antenna (LISA) project. This project will use three satellites in solar orbit to detect gravitational waves at low frequencies inaccessible to ground-based gravitational wave detectors.

The LISA variant of the NPRO design is designated the "micro-NPRO" or μNPRO. The European Space Agency (ESA) is the lead organization for the LISA project, and they require a strain-tuning range of ±100 MHz at a bandwidth of 100 kHz. Typical commercial NPROs have a strain tuning coefficient of 1 MHz/volt, so meeting the ESA specification would require ±100 volts.

For use in space, it is desirable to keep voltages low and to use a simple design. One of the goals of the μNPRO design was to achieve ±100 MHz of strain tuning without the use of high-voltage amplifiers. Standard operational-amplifiers typically provide ±12 volts, so the goal was ±100 MHz tuning with ±12 volts, implying a strain-tuning coefficient of 8.33 MHz/volt or larger.

For terrestrial ranging applications using FMCW (frequency-modulated, continuous-wave) LIDAR (Light Detection and Ranging), a large frequency tuning range and high frequency slew rate are also important parameters. Similarly, optical coherence tomography applications can benefit from laser sources with these characteristics.

There is a need for a compact laser source having a large frequency turning range and high frequency slew rate.

SUMMARY

In one aspect of the current invention, a laser assembly having an adjustable output frequency is described. The laser assembly has a solid-state gain element having four reflective facets, a top face, and a bottom face. The four reflective facets define a nonplanar ring lasing path that lies entirely within the solid-state gain element. The nonplanar ring lasing path defines a first lase plane and a second lase plane. A piezo-electric element is bonded to the top face of the solid-state gain element. A distance between the first lase plane and the top face is selected from a group of distances of less than 40%, 30%, 20%, 15% and 10% of a thickness of the solid-state gain element.

In another aspect of the current invention, a laser assembly having an adjustable output frequency is described. The laser assembly has a solid-state gain element having four reflective facets, a top face, and a bottom face. The four reflective facets define a nonplanar ring lasing path that lies entirely within the solid-state gain element. The nonplanar ring lasing path defines a first lase plane and a second lase plane. A piezo-electric element is bonded to the top face of the solid-state gain element. A distance between the first lase plane and the top face is selected from a group of distances of less than 100, 200, 300, and 400 microns.

BRIEF DESCRIPTION OF THE FIGURES

The following detailed description will be better understood when read in conjunction with the appended figures, in which there is shown in the figures example embodiments for the purposes of illustration. It should be understood, however, that the present disclosure is not limited to the precise arrangements and instrumentalities shown in the figures.

FIG. 1 shows a representative μNPRO package according to an embodiment of the current invention.

FIG. 2A shows a μNPRO crystal according to an embodiment of the current invention.

FIG. 2B shows a μNPRO crystal with a piezo-electric element attached on top and the temperature-controlled support structure according to an embodiment of the current invention.

FIGS. 5A-5C show three piezo-electric element/YAG composite structures with different ratios between the piezo-electric element and YAG thickness according to embodiments of the current invention.

FIG. 6 shows a graph of a tuning coefficient calculated as a function of the distance from the piezo-electric element/ YAG interface to the laser beam according to an embodiment of the current invention.

DETAILED DESCRIPTION

Figure 3:
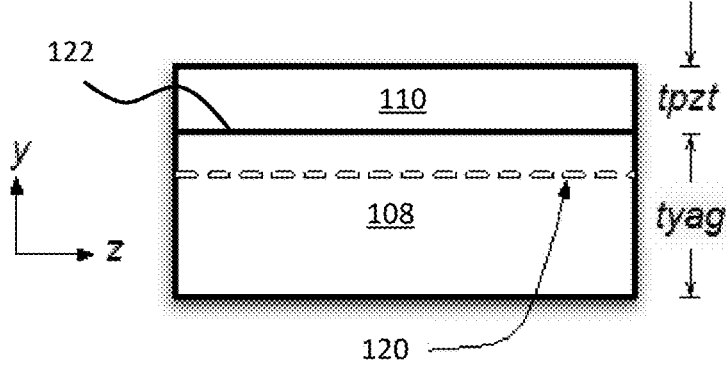
FIG. 3 is a simplified schematic diagram defining the dimensions and coordinates of a μNPRO crystal with a bonded piezo-electric element according to an embodiment of the current invention.

FIG. 1 shows a completed μNPRO package 100 according to an embodiment of the current invention. The overall dimensions of the enclosure are 58×41×14 mm, not including the feet 102 and connector 104. The μNPRO package 100 may be configured to output light is in a polarization-maintaining single-mode fiber 106 as shown in FIG. 1; however, this is not a requirement. The fiber alignment and fixing are based on welding. There is no isolator needed in the μNPRO package 100, due to the fact that the μNPRO has immunity to small amounts of feedback. The fiber entrance face is angle-polished and anti-reflection coated, so feedback from the fiber facet is low. The μNPRO package 100 contains two pump lasers which are polarization-combined; however, other versions of a μNPRO package 100 may use a single pump laser. If the pumps were operated at rated power, the μNPRO package 100 would provide over 0.7 watts of fiber-coupled single-frequency output at 1064 nm. The requirements of the LISA project are much lower (~0.07 watts), resulting in very long projected lifetime. The overall system being developed by NASA includes an ytterbium-doped fiber amplifier (YDFA) arranged to amplify an output of the μNPRO package 100, so all the μNPRO needs to do is to provide enough power to thoroughly saturate the input stage of the YDFA.

FIG. 2A shows a solid-state gain element 108 and FIG. 2B shows the solid-state gain element 108 bonded to a piezo-electric element 110. The solid-state gain element 108 may have four reflective facets, a top face, and a bottom face and the four reflective facets that define a nonplanar ring lasing path that lies within the laser solid-state gain element 108. The solid-state gain element 108 may be a crystal or glass having a non-zero Verdet coefficient. For example, the solid-state gain element 108 may be made of neodymium-doped yttrium aluminum garnet (YAG) co-doped with chromium. Doping the YAG crystal with chromium increases the YAG's resistance to color center formation in the presence of ionizing radiation and is beneficial in high radiation environments, such as outer space. Chromium doping may not be necessary in terrestrial environments having low radiation levels. The solid-state gain element 108 forms a solid, monolithic resonator that defines a closed lasing path within the gain element. There are four optical facets, which are reflection points for the closed lasing path. Three of the four optical facets are total internal reflection surfaces at angles to the overall block of solid-state gain element 108. The fourth optical facet serves as an optical coupler and has an optical coating to provide an appropriate level of reflectivity at an operating wavelength of the solid-state gain element 108. The position and orientation of the four optical facets define a unique nonplanar ring lasing path through the solid-state gain element 108. The nonplanar ring lasing path consists of a first lase plane and a second lase plane. In this embodiment, the μNPRO has an out-of-plane angle of 45° between the first lasing plane and second lasing plane, but other out-of-plane angles may be used. The solid-state gain element 108 also has a top face 112 and a bottom face 114, which do not intersect the lasing path. The first lase plane may be parallel or substantially parallel to the top face 112 of the solid-state gain element 108. In this exemplary embodiment, the overall dimensions of the solid-state gain element 108 are 5.7×4.4×1.75 mm; however, both larger and smaller crystal sizes may be used.

FIG. 2B shows the solid-state gain element 108 bonded to various elements forming a laser assembly 116. The bottom face of the solid-state gain element 108 may be bonded to a temperature-controlled platform 118, which allows temperature control of the solid-state gain element 108. The temperature-controlled platform may include a thermoelectric cooler and/or a resistive heater. The top face of the solid-state gain element 108 may be bonded to the piezo-electric element 110, such as, but not limited to, a piece of lead zirconium titanate (PZT). The PZT is poled in its thin dimension so that when a voltage is applied to the PZT it attempts to reduce or increase the area of the bonded surface. This applies a strain to the solid-state gain element 108, which tunes an output laser frequency.

In order to enforce unidirectional operation of the laser assembly 116, the solid-state gain element 108 is placed in a magnetic field. The magnetic field induces a nonreciprocal polarization rotation for light travelling within the solid-state gain element 108 through the Faraday effect. The nonreciprocal polarization rotation results in a differential loss for light traveling around the oscillator ring in opposing directions. The oscillation direction with the lowest loss will lase and use the available optical gain. Thus, oscillation in the opposed direction will have insufficient optical gain to lase unless there is a high level of external feedback in the opposed direction.

Theory of Strain Tuning

This section describes a method to calculate the frequency tuning coefficient in units of megahertz of optical frequency change per volt applied to the piezo-electric element.

A full calculation would be quite an onerous task. The calculation described herein is sufficient to provide design insight. This section describes three simplified calculations that will give an idea of what parameters are important in maximizing the frequency tuning coefficient.

When a laser is oscillating on a single mode and it is tuned by stretching the resonator by a small amount, the wavelength A and optical frequency f change according to the equation $$\frac{\Delta\lambda}{\lambda} = \frac{\Delta \text{ optical path length}}{\text{optical path length}} = \frac{-\Delta f}{f}. \qquad (1)$$

5

The fractional change in wavelength is the same as the fractional change in the optical path length of the resonator. This must be true since the same number of wavelengths fit into the resonator before and after the change in resonator length. For small changes, the fractional change in optical frequency is simply the negative of the fractional change in wavelength.

The change in optical path length is due to two effects. First is the simple dimensional change in the resonator, and second, the change in the index of refraction due to the elasto-optic effect. Initially, we ignore the elasto-optic effect. With this simplification, the fractional change in the optical path length is the same as the fractional change in the resonator size. The fractional change in resonator size is by definition the mechanical strain, given by E. Positive values of strain correspond to lengthening. The frequency change $\Delta f$ is given by $$\Delta f = -f\epsilon \tag{2}$$

where $\epsilon$ is the strain in the solid-state gain element, averaged over the beam path.

FIG. 3 shows the geometry of the piezo-electric element/gain element structure. The piezo-electric element 110 is bonded to a face of the solid-state gain element 108, for example, a piece of Nd:YAG. The piezo-electric material may be PZT, but other piezo-electric materials may be used. This piezo-electric element 110 is poled in the y direction, that is, the thin dimension of the piezo-electric element 110. The thickness of the piezo-electric element 110 is $t_{PZT}$ and the thickness of the solid-state gain element 108 is $t_{YAG}$. The following analysis will assume that the piezo-electric element 110 is formed from PZT and the solid-state gain element 108 is formed from Nd:YAG; however, this is not a requirement.

Lumped Element "Two Spring" Model of Strain

Figure 4:
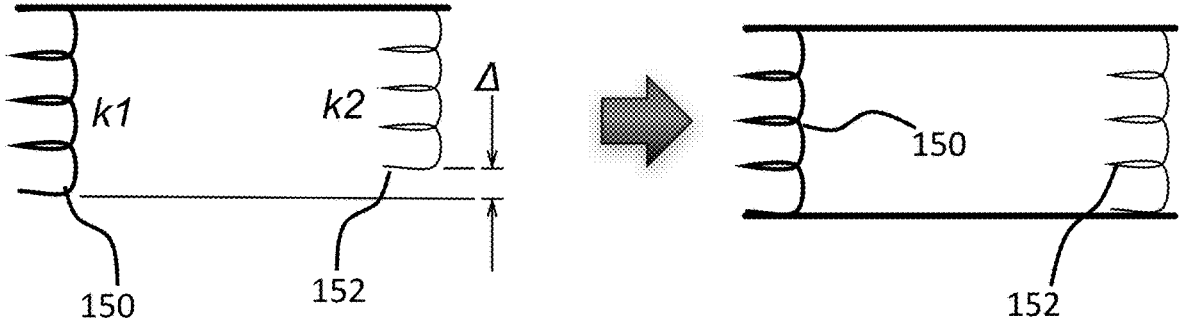
FIG. 4 shows a simple model that may be used to determine strain in a μNPRO crystal with a bonded piezo-electric element according to an embodiment of the current invention.

The first estimate of $\epsilon$ assumes that strain is uniform throughout the piezo-electric element/gain element structure. Under this assumption, the piezo-electric element and solid-state gain element structure are considered as "lumped elements," specifically as simple springs. Each element is characterized by a spring constant. The two elements are connected in parallel in such a way that they must end up with the same length. Due to the voltage applied to the piezo-electric element 110, they would have slightly different lengths in their unconstrained state, if they were not bonded to each other. Each spring in the bonded state adjusts so that they end up with the same length, and with equal and opposite internal forces. FIG. 4 shows this "parallel spring" model.

If two springs, a first spring 150 and a second spring 152, of spring constants $k_1$ and $k_2$, respectively, have a difference in their unconstrained lengths $\Delta$, and they are tied together in such a way that they are forced to have the same length, then the change in the length of the first spring 150 with spring constant $k_1$ is given by $$\Delta_1 = \frac{\Delta k_2}{k_1 + k_2} \tag{3}$$

The spring constant of each element in the piezo-electric/gain element structure is proportional to $Yt/(1-v)$ where Y is the Young's modulus of the material, v is Poisson's ratio, and t is the thickness of the element, either $t_{PZT}$ or $t_{YAG}$. We will drop the Poisson's ratio divisor, since it will end up cluttering the final equation without much changing the result. It would show up only as the ratio $(1-v_{PZT})/(1-v_{YAG})$ and as can be seen by looking at Table 1, the Poisson's ratios of YAG and the PZT are similar. If you want to keep the effect of Poisson's ratio, simply replace Y by $Y/(1-v)$ in the equations for both materials.

When a voltage is applied to the piezo-electric element 110 along the y dimension, and the piezo-electric element 110 is unconstrained, the voltage-induced strain in both of the transverse dimensions x and z is given by $$\epsilon_V = d_{31}E = d_{31}\frac{V}{t_{PZT}} \tag{4}$$

where $d_{31}$ is a property of the piezo-electric material and E is the electric field inside the piezo-electric element 110, equal to the applied voltage V divided by the thickness of the piezo-electric element 110, $t_{PZT}$. This value $\epsilon_V$ plays the role of 4, the difference in the unconstrained lengths of the two springs, that is, it is the amount by which the piezo-electric element 110 would move relative to the solid-state gain element 108 if they were not bonded together.

Carrying through the calculation using this spring analogy, the strain in the solid-state gain element is $$\epsilon = \frac{V\gamma_{PZT}d_{31}}{(\gamma_{YAG}t_{YAG} + \gamma_{PZT}t_{PZT})}. \tag{5}$$

Combining this expression with Equation (2) and dividing out voltage V yields the tuning coefficient in units of Hertz per volt.

$$\text{Tuning coefficient} = \frac{f\gamma_{PZT}d_{31}}{(\gamma_{YAG}t_{YAG} + \gamma_{PZT}t_{PZT})} \tag{6}$$

Even though this equation is an oversimplification, it provides a useful first approximation of the effect, and it makes three predictions that are confirmed by a more complete analysis.

First, Equation (6) shows that the figure of merit for a piezo-electric element 110, if the goal is to maximize the Hertz per volt, is $Y_{PZT} d_{31}$. If Poisson's ratio had been carried through it would be $Y_{PZT} d_{31}/(1-v_{PZT})$.

Second, Equation (6) shows that it is best to keep $t_{PZT}$ as small as practical, even if $t_{YAG}$ is fixed, although once $Y_{YAG}t_{YAG} \gg Y_{PZT}t_{PZT}$ there is little value in further reducing $t_{PZT}$.

Third, it shows that scaling the overall design down while maintaining proportions increases the response per volt as the inverse of the scaling factor.

Table 1 provides relevant material property values and dimensions for an exemplary µNPRO for the parameters of Equation (6).

TABLE 1

| | | |
|---|---|---|
| Young's Modulus of YAG, $Y_{YAG}$ | 277 | GPa |
| Young's Modulus of PZT material 3265HD, $Y_{PZT}$ | 69 | GPa |
| Poisson's ratio of YAG, $v_{YAG}$ | 0.30 | |
| Poisson's ratio of PZT material 3265HD, $v_{PZT}$ | 0.32 | |
| Charge constant of PZT material 3265HD, $d_{31}$ | −370 | picometers/volt |
| Thickness of YAG for LISA µNPRO, $t_{YAG}$ | 1.75 | mm |

TABLE 1-continued

| Thickness of PZT for LISA μNPRO, $t_{PZT}$ | 0.25 mm |
|---|---|
| Optical frequency at 1064 nm | 282 THz |
| Optical frequency at 1319 nm | 227 THz |

For the 1064 nm line of Nd:YAG, the PZT tuning coefficient calculated using Equation (6) is 14.3 MHz/volt. For 1319 nm, it is 11.5 MHz/volt. These values would be increased by about 3.6% if $t_{PZT}$ were reduced to zero. Keeping the (1−v) factors increases the calculated response by 1.4%.

Effect of Change in Index Due to Elasto-Optic Effect

The index of refraction changes with strain, and that also leads to tuning. This effect may increase or decrease the tuning coefficient relative to the result above, depending on both the polarization of the resonant light and the crystal orientation. A complete calculation would be quite complex, because in YAG the strength of the elasto-optic effect varies a great deal as crystal orientation changes. This section calculates the effect for two simple cases that give an indication of both the magnitude and the variability of the effect.

The orientation for which the calculation of the elasto-optic effect is easiest is where the <100> crystalline axis and the equivalent <010> and <001> axes are aligned with the major planes defining the NPRO block. For this case a relatively simple equation gives the effect of the index change due to strain relative to the effect that is due to dimensional change alone, that is to say, relative to the value calculated using Equation (6). The equation for light polarized along the y axis (perpendicular to the plane of the PZT/YAG interface, or "vertical") is $$\frac{\text{index effect}}{\text{dimensional effect}} = -\frac{n^2}{2}(-2vp_{11} + 2(1-v)p_{12})/(1-v) \quad (7)$$

where n is the index of refraction of YAG, v is the Poisson's ratio of YAG, and $p_{11}$ and $p_{12}$ are elements of the elasto-optic tensor. Table 2 has the relevant material properties values of YAG used to calculate the elasto-optic effect on strain tuning. For the values of Table 2, Equation (7) gives a value of −7.13%. The piezo-electric element response is reduced due to the elasto-optic effect.

TABLE 2

| Index of refraction of YAG, n | 1.82 |
|---|---|
| Poisson's ratio of YAG, $v_{YAG}$ | 0.30 |
| YAG elasto-optic coefficient $p_{11}$ | −0.0290 |
| YAG elasto-optic coefficient $p_{12}$ | 0.0091 |
| YAG elasto-optic coefficient $p_{44}$ | −0.0615 |

For the other polarization, in the plane of the PZT-YAG interface or "horizontal," the corresponding equation is $$\frac{\text{index effect}}{\text{dimensional effect}} = -\frac{n^2}{2}((1-v)p_{11} + 2(1-3v)p_{12})/(1-v) \quad (8)$$

For the values of Table 2, Equation (8) gives value of +4.59%. The PZT response is increased.

If the crystalline axes of the YAG are re-oriented such that the axis of propagation remains one of the <100> equivalents, but the other two <100> equivalents are at 45° relative to the plane of the PZT/YAG interface, then the deviation from the "dimensional effect only" case is significantly larger. The equations corresponding to Equations (7) and (8), for this "45° rotated" case, are given below.

The equation for light polarized along the y axis (perpendicular to plane of piezo-electric element-YAG interface, vertical) is $$\frac{\text{index effect}}{\text{dimensional effect}} = \quad (9)$$
$$-\frac{n^2}{4}((1-3v)p_{11} + (3-5v)p_{12} - (2-2v)p_{44})/(1-v)$$

Equation (9) gives a value of −20.19%.

For the other polarization, in the plane of the PZT-YAG interface, the corresponding equation is $$\frac{\text{index effect}}{\text{dimensional effect}} = \quad (10)$$
$$-\frac{n^2}{4}((1-3v)p_{11} + (3-5v)p_{12} + (2-2v)p_{44})/(1-v)$$

Equation (10) gives a value of +17.64%.

Table 3 summarizes these four cases. Other cases have been calculated, and it appears that the two that are tabulated are the "extreme" cases; other orientations seem of fall within the range defined by these two.

It is clear that the YAG elasto-optic effect is highly anisotropic. It is also clear that the effect of the elasto-optic effect, while significant, is much smaller than the effect of dimensional change. Unless there is a need for extreme unit-to-unit consistency, it is not worth the trouble to orient YAG for NPRO manufacturing. Variation from unit to unit in PZT response will be dominated by the challenge of controlling the distance between the resonant laser beam and the PZT/YAG interface.

Table 3 shows the elasto-optic deviation of total PZT response from the response due to dimensional change only, for two cases with the <100> axis being the axis of beam propagation.

TABLE 3

| YAG Crystal Orientation: | Vertical polarization (along y) | Horizontal polarization (along x) |
|---|---|---|
| <010> axis normal to PZT/YAG interface | −7.13% | +4.59% |
| <010> axis 45° to PZT/YAG interface | −20.19% | +17.64% |

The polarization of the internal beam in an NPRO is elliptical, but with most of the power in the "vertical" polarization. In the two cases of Table 3, the elasto-optic effect will reduce the PZT tuning of typical NPROs.

Two-Dimensional Numerical Calculation of Deformation of PZT/YAG Composite Structure The simple "two spring" model, shown in FIG. 4, assumes that strain in the YAG is constant throughout, which is far from the truth. In fact, the strain is concentrated in a region close to the PZT/YAG interface. Locating a first lasing plane 120 of the nonplanar ring lasing path close to this interface will greatly enhance the tuning coefficient. FIG. 3 shows a position of the first lasing plane 120 relative to the piezo-electric/gain element interface 122.

The exact shape of a NPRO deformed by a piezo-electric element will depend on the details of the NPRO geometry. In order to get a solution that is more general but demonstrates the nature of the distortion, we chose to calculate the distorted shape of an infinitely long piece of YAG with a rectangular cross-section. Referring back to FIG. 3, the dimension x is infinite.

Calculations with this geometry can be done using the "plane strain" assumption. Under this assumption, all displacement is assumed to be in y-z plane. Established techniques for numerically solving plane strain problems may be used to determine the stain as a function of distance from the piezo-electric element/YAG interface.

FIGS. 5A-5C shows cross-sections of three calculated piezo-electric element 110/gain element 108 structures, highly exaggerated in the horizontal or z-direction. All three have the same voltage applied to the piezo-electric element 110. FIG. 5B has the dimensions used in the μNPRO example shown in FIGS. 2A, 2B and 3.

A noteworthy result is that there is a position in the solid-state gain element 108 where there is no displacement. Farther from the piezo-electric element/gain element interface the displacement actually changes sign. It is clear that it is desirable to have the first lasing plane as close as is practical to the piezo-electric element/gain element interface 122.

FIG. 5A shows what happens when the piezo-electric element 110 is made thicker, in this case, by a factor of two. With a smaller internal field, the piezo-electric element would be expected to strain half as much. But since it is stiffer due to its greater thickness, it can strain the solid-state gain element 108 by almost as much as the thin piezo-electric element 110. As in the simple spring model of Equation (6), a thicker piezo-electric element 110 will reduce tuning, but not by much once $t_{pzt}$ goes below a small fraction of the solid-state gain element 108 dimension.

FIG. 5C shows what happens when the thickness of the solid-state gain element 108 is doubled. This deformed region remains about the same in absolute size. The deformed region extends downward for a distance of about 25% of the z-dimension of the solid-state gain element 108.

FIG. 6 is a graph of the frequency tuning coefficient versus the distance between the first lase plane and the piezo-electric/gain element interface. The graph is determining the deformation of the solid-state gain element 108, in this case Nd:YAG, and then calculating a frequency tuning coefficient, using Equation (2). The calculation assumes a PZT thickness of 0.25 mm, a YAG thickness of 1.75 mm along the y-direction and a length of 5 mm along the z-direction. The size of the PZT and YAG are assumed to be infinite in the x-direction in this calculation. This calculation also ignores the nonplanarity of the lasing path. For the exemplary μNPRO design disclosed earlier, three reflection points are at a distance 0.25 mm from the piezo-electric element/gain element interface 122 and the fourth is at 1.25 mm. According to FIG. 6, the fourth point is in the region where the distortion has the opposite sign. The expected tuning coefficient if all reflections were at a distance of 0.25 mm from the lase plane would be 23.6 MHz/Volt.

It is clear from FIG. 6 that the tuning coefficient will be a strong function of the first lasing plane position. That is the distance between the first lase plane portion of the nonplanar ring lasing path and the piezo-electric element/gain element interface 122 (see FIG. 3). This functional dependence will result in unit-to-unit variability in the tuning coefficient if there is inconsistency in the fabrication of the solid-state gain element 108 that results is in variability of the resonant ring path location.

Our final estimate of the tuning coefficient was made by assuming that the four μNPRO reflection points move relative their centroid according to FIG. 6, with motion determined by the distance from that point to the piezo-electric element/gain element interface 122. This assumption allows the calculation of the change in the round-trip path. The resulting tuning coefficient value is 17.6 MHz/Volt. It will be seen that his estimate is quite close to reality.

Finite Element Calculation of First Mechanical Resonance

A limit on the usefulness of a frequency-tuned oscillator is the speed of response. For piezo-tuning, the response is flat in frequency until the first resonance. The first resonance may be determined using finite element analysis. For a block of YAG of dimensions 5.7×4.4×1.75 mm, the first resonance is a torsion resonance at 338 kHz. This also will be seen to be close to the experimentally observed result as described below.

If it is desired to increase the useful frequency bandwidth, then the solid-state gain element 108 should be made thicker, at least until the thickness dimension $t_{YAG}$ matches the other two dimensions. This will increase the frequency of the flexural and torsion resonances. Reducing the long dimensions will also increase the resonance frequency.

Experimental Results

Figure 7:
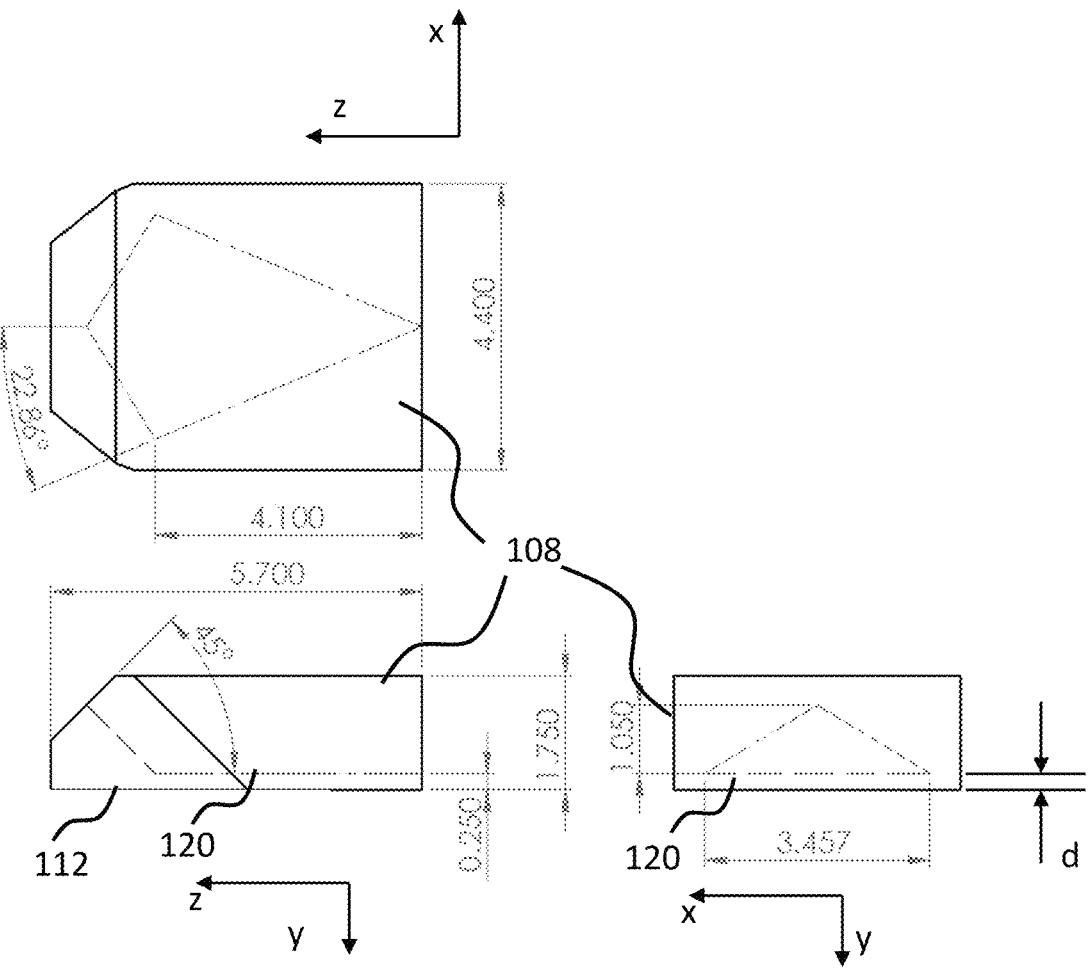
FIG. 7 shows a dimensioned drawing of a μNPRO monolithic resonator according to an embodiment of the current invention. The dashed lines are the beam path.

Controlling the Distance from the Piezo-Electric Element/YAG Interface to the Resonant Beam Path FIG. 7 shows a mechanical drawing of a solid-state gain element 108 according to an embodiment of the current invention. All dimensions in this drawing are in millimeters This exemplary solid-state gain element 108 is formed from Nd:YAG. The solid-state gain element 108 is designed so that a distance, d, from the first lase plane 120, which is the plane containing the larger of the two isosceles triangles that form the nonplanar ring lasing path and is nominally in the xz-plane, is 0.25 mm from the top face 112 of the solid-state gain element 108. Controlling that dimension accurately requires good tooling to fabricate the solid-state gain element 108. The tooling used to manufacture the solid-state gain element 108 has all of the angles and dimensions built in, so that the fabrication process is no more difficult than for any other piece of gain material.

The cost of producing a solid-state gain element is driven by the size of the starting material and the area of the polished surfaces. The compound angles do not impact the cost once the tooling is designed and produced. The solid-state gain elements experimentally investigated were produced in batches of 24; however, larger batch sizes are possible by using different tooling.

The solid-state gain element has been produced both with all-planar reflecting surfaces, in which case the beam properties are determined by thermal lensing, and with an R=150 mm convex curvature on the front, output coupling face. The longest dimension of the solid-state gain element, denoted as a length along the z-axis, is 5.7 mm. The dimension of the solid-state gain element in the x-axis, denoted as a width, is 4.4 mm. The dimension of the solid-state gain element in the y-axis, denoted as a thickness, is 1.75 mm. The solid-state gain element was fabricated from Nd:YAG doped with chromium to enhance its radiation resistance.

Table 4 summarizes the mechanical parameters of the exemplary solid-state gain element 108 depicted in FIG. 7.

TABLE 4

| Controlling Dimensions | |
| --- | --- |
| Angle of incidence on front face | 22.86° |
| Out-of-plane angle | 45° |
| Angle of incidence on back face | 49.34° |
| Altitude of base triangle | 4.1 mm |
| First lase plane position | 0.25 mm |
| Length | 5.7 mm |
| Width | 4.4 mm |
| Thickness | 1.75 mm |
| Derived Dimensions | |
| Angle of incidence on side faces | 49.34° |
| Round trip distance | 13.456 mm |

An initial concern was the yield of the solid-state gain element. The position of the resonant beam path cannot be adjusted once the solid-state gain element is manufactured, and if the resonant beam path is too close to the edge of the solid-state gain element, or outside the solid-state gain element, then the device will never reach lasing threshold at any amount of pump power. Solid-state gain elements produced by three manufacturers were investigated. All had adequate control of first lase plane position. Table 5 shows the statistics of the three manufacturers for the distance between the first lase plane and the top face of the solid-state gain element.

TABLE 5

| Gain Element Fabricator | Number parts tested | Average position of first lase plane (0.25 mm by design) | Standard Deviation of First Lase Plane position |
| --- | --- | --- | --- |
| #1 | 7 | 0.26 mm | 0.02 mm |
| #2 | 62 | 0.20 mm | 0.06 mm |
| #3 | 4 | 0.24 mm | 0.03 mm |

Choice and Properties of Piezo-Electric Material

It is desirable to use a piezo-electric element material that has the highest figure of merit $Y_{PZT}$ $d_{31}$ available. The piezo-electric element material chosen in the experimental demonstration described here is 3265HD available from CTS Corporation located in Lisle, IL. The thickness used was 0.25 mm. For an 0.25-mm part the maximum recommended voltage is 125 volts. The shape of the piezo-electric element closely matches the top surface of the μNPRO, with no overhang, as can be seen in FIG. 1. A wrap-around electrode is used. It is important that the piezo-electric element have no overhang. Overhang will create undesirable low-frequency resonances in the response. Table 6 summarizes the properties of the piezo-electric material and the specific piezo-electric element used in the experimental study.

TABLE 6

| Young's Modulus of piezo-electric material* 3265HD, $Y_{PZT}$ or $Y^{E}_{11}$ | 69 GPa |
| --- | --- |
| Poisson's ratio of piezo-electric material 3265HD, $v_{PZT}$ | 0.32 |
| Charge constant of piezo-electric material 3265HD, $d_{31}$ | −370 picometers/volt |
| Thickness of piezo-electric for LISA μNPRO, $t_{PZT}$ | 0.25 mm |

TABLE 6-continued

| Area of piezo-electric for LISA μNPRO, A | 21 mm² |
| --- | --- |
| Dielectric constant of piezo-electric material 3265HD, $K^{T}_{3}$ | 6500 |
| Capacitance of piezo-electric, according to C = $K^{T}_{3}$ $\varepsilon_0$ A/$t_{PZT}$ | 4780 pF |

*The Young's Modulus of a piezo-electric material depends on both its orientation and on whether it is measured "open circuit" (charge held constant) or "short circuit" (voltage held constant.) The relevant value of Y for our design is designated by piezo-electric manufacturers as $Y^{E}_{11}$, the short-circuit elastic constant perpendicular to the poling direction.

The piezo-electric element may be bonded to the YAG by an epoxy 353-ND available from Epoxy Technology Inc. located in Billerica, MA. This epoxy has low viscosity right before it cures, so that a very thin bond can be created.

The piezo-electric/gain element subassembly was mounted to its temperature-controlled support using a compliant adhesive, so that the gain element is free to deform, limited only by its own stiffness.

Measurement of Frequency Tuning Coefficient

Figure 8:
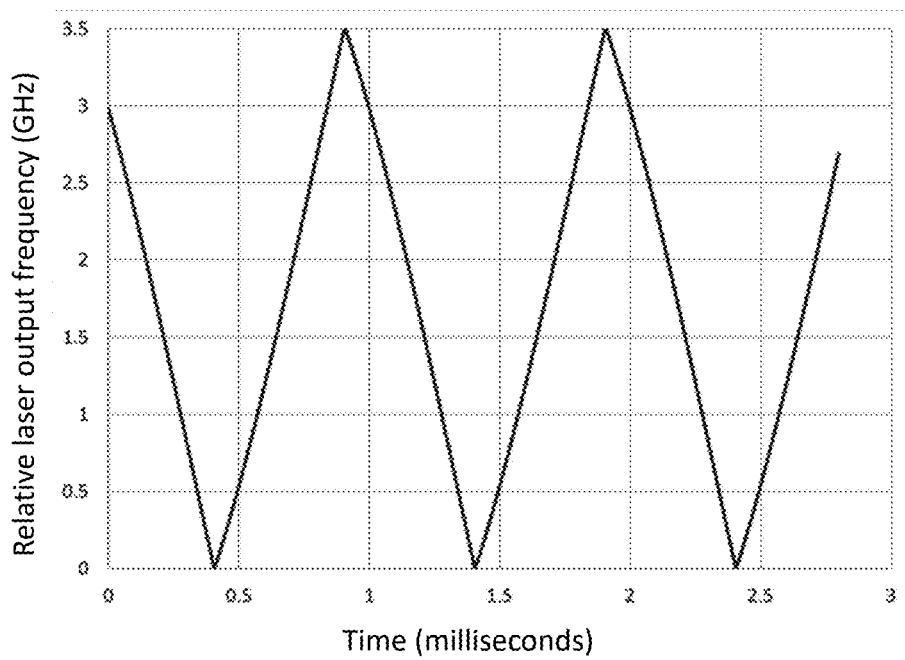
FIG. 8 is a graph showing a measured beat frequency of a μNPRO as a function of time with a 1 kHz triangle wave of amplitude 192 volts peak-peak applied to a piezo-electric element.

FIG. 8 shows frequency as a function of time for a piezo-electric tuned μNPRO driven by a 1-kHz triangle wave with a peak-to-peak drive of 192 volts. The peak-to-peak frequency excursion is 3.5 GHz. The rate of change of the frequency, the frequency slew rate, in the linear region of the waveform is 7.0 THz/second. The tuning coefficient is 3.5 GHz/192 volts=18.2 MHz/volt. This is a surprisingly good match to the estimate of 17.6 MHz/volt disclosed earlier. For FIG. 8, the frequency was measured every 0.4 μsec, so there are 7000 frequency values displayed. No smoothing was applied to the data.

The frequency modulation with a 100 kHz sine wave with a peak-to-peak voltage of 64 volts was also evaluated. The peak-to-peak frequency excursion was 1.03 GHz, indicating a tuning coefficient of 16.1 MHz/volt.

All measurements of frequency were made by observing a beat note with a reference NPRO on an oscilloscope. A digitizing oscilloscope with a long record length (many millions of points) is a very useful tool for frequency analysis. A quasi-sinusoidal record of voltage as a function of time can be converted into frequency as a function of time, and then that record analyzed.

The response of the piezo-electric element as a function of Fourier frequency was measured by driving the piezo-electric element with white noise of known spectral density, creating a frequency vs. time record, and then calculating its spectral density. The result of this experiment is plotted in FIG. 9, which shows the response of the piezo-electric element from DC to 1 MHz. As can be seen from FIG. 9, there are frequencies at which the response of the μNPRO to the drive voltage goes through resonances. The first resonance at 323 kHz limits the "flat response" region. This closely matches the theoretical estimate of the first resonant frequency of 338 kHz that was disclosed earlier. The low-frequency strain tuning coefficient, which is the coefficient at frequencies in the flat response region below the first resonance, is approximately 20 MHz/Volt. The system also has resonances at approximately, 480 kHz, 630 kHz and 910 kHz. At these resonances, the frequency tuning coefficient of the laser, as measured in MHz/volt, may greatly exceed the response in the flat response region. As shown in FIG. 10, at 323 kHz, the tuning coefficient is 125 MHz/volt, and at 910 kHz, it is 210 MHz/volt. By operating at resonance, very large frequency modulation is possible at low voltage. Aside from resonances, there are also anti-resonances. For example, there is an anti-resonance near 420 kHz where the tuning coefficient is very low, <2 MHz/Volt.

Features of a µNPRO Laser

A feature of a µNPRO laser may be that the optical facets of the µNPRO crystal are arranged such that a lasing path within the solid-state gain element lies entirely within a section of the solid-state gain element adjacent the piezo-electric element. For example, the lasing path may lie entirely in the top half of the solid-state gain element if the piezo-electric element is bonded to the top face of the solid-state gain element. Advantageously, this arrangement of the lasing path results in the strain tuning coefficient having the same sign along the entire lasing path, resulting in a larger strain tuning coefficient. The strain tuning coefficient may exceed 10 MHz/Volt, which is at least an order of magnitude greater than the strain tuning coefficient of prior art NPRO lasers.

Another feature of a µNPRO laser may be placement of the first lase plane relative to the top and bottom faces of the solid-state gain element. Prior art NPRO lasers had the first lase plane centrally located between the top and bottom face of the solid-state gain element. Centrally placing the lase plane with respect to the solid-state gain element thickness resulted in the most relaxed mechanical tolerance on solid-state gain element fabrication. As noted earlier, the strain tuning coefficient (change in output frequency per applied voltage) can be increased by placing the first lasing plane closer to the face having the bonded piezo-electric element. µNPRO lasers may be characterized by having the first lasing plane be less than 40%, 30%, 25%, 20%, 15% or 10% of the solid-state gain element thickness from the face bonded to the piezo-electric element. In other embodiments, the lase plane may be within 100, 200, 300, 400, or 500 microns of the solid-state gain element face bonded to the piezo-electric element.

Yet another feature of a µNPRO laser may be a solid-state gain element, which enables a relatively short round trip cavity length. For the µNPRO laser shown in FIG. 7, the cavity path length is approximately 13 mm. If the solid-state gain element is formed from YAG and lasing wavelength is 1319 nm, where YAG has a refractive index of approximately 1.81, the cavity path will be approximately 17,800 waves long. µNPRO lasers may be characterized as having the round trip cavity length less than 50,000, 20,000, 10,000, or 5,000 times a length of the lasing wavelength in the solid-state gain element. This cavity length is shorter than in most prior art NPRO lasers.

Yet another feature of a µNPRO laser may be that the piezo-electric element is as thin as possible. The piezo-electric element thickness may be less than 0.5, 0.4, 0.3, or 0.2 mm thick or in a range between any of these values. Having a very thin piezo-electric element helps to increase the stain tuning coefficient, since for the same applied voltage the electric field across the piezo-electric element is proportional to the inverse of the piezo-electric element thickness.

Yet another feature of a µNPRO laser may be use of a piezo-electric material with the largest strain tuning figure-of-merit, defined as the product of the piezoelectric charge constant $d_{31}$ and the Young's modulus Y. Using such a material, results in the µNPRO laser having a larger tuning coefficient, which allows large frequency sweeps using a small drive voltage.

The first mechanical resonance of the piezo-electric/gain element subassembly limits the frequency range over which its strain-tuning coefficient is independent of frequency. This condition of having the strain-tuning coefficient independent of frequency makes it more convenient and straightforward to create frequency modulation in the shape of a triangle wave, as is often desired for FMCW LIDAR. It may be desirable to have a flat frequency response up to five or ten times a fundamental frequency of the triangle wave. Thus, for a NPRO laser to be used for FMCW LIDAR with triangle wave frequency modulation, it is desirable that the first mechanical resonance be at as high a frequency as possible.

If the only goal were to have a high frequency mechanical resonance, then the solid-state gain element would be constructed as small as possible, with all dimensions (length, width, and thickness) roughly equal. This is not practical, since such a solid-state gain element would not lase in a robustly unidirectional manner due to having insufficient differential loss between a clockwise and counterclockwise lasing direction. The dimensions of the solid-state gain element in the directions designated as x (width) and z (length) in FIG. 7 will determine the lasing path in the first lase plane, which lies in a x-z plane. The third dimension, designated as the thickness (y-direction) is the dimension perpendicular to the x-z plane. Once above the minimum required to contain the lasing path, this dimension is not constrained by optical design considerations. For prior art solid-state gain element, the thickness was the smallest of the three dimensions of the solid-state gain element. By increasing the thickness, while keeping the laser beam close to the surface bonded to the piezo-electric element, it is possible to raise the frequency of the first mechanical resonance substantially while maintaining a large strain-tuning coefficient. Prior art solid-state gain elements have a value of thickness which is 25% of the length, the largest dimension, of the solid-state gain element. That is prior art solid-state gain elements have the thickness of the solid-state gain element being 25% or less the length of the solid-state gain element. The solid-state gain element shown in FIG. 7 has a ratio of the thickness to the length of 1.75 mm/5.7 mm=31%. Using a ratio of the solid-state gain element thickness to the solid-state gain element length greater than 30%, 40%, 50%, 75% or 100% will increase the frequency of the first mechanical resonance, and thus the frequency at which a triangle wave frequency scan can be conveniently generated. Likewise, having a solid-state gain element width close to the solid-state gain element length is desirable to increase the frequency of the first mechanical resonance.

The solid-state gain element has been described as using Nd doped YAG as a gain material, but in alternative embodiments other gain materials may be used. In particular other Nd doped garnet crystals, such as, but not limited to, Gadolinium Gallium Garnet (GGG), may be used. GGG has a smaller Young's modulus than YAG and thus there is more strain for a constant applied stress. Advantageously having more strain will increase the strain tuning coefficient, lowering the drive voltage required to tune the µNPRO laser output frequency.

The amount of strain induced in the solid-state gain element for a given applied force can be increased in other ways. In an alternative embodiment, the solid-state gain element 108 may have a hole 126 as shown in FIG. 10. The hole 126 may be a through hole extending between the top face 112 and bottom face 114 of the solid-state gain element 108. The hole 126 may be round or have any cross-sectional shape. The hole 126 may be situated so that the lasing path surrounds the hole 126. The hole 126 is arranged so that it does not interfere with the lasing path in the solid-state gain element 108, and so that there is no extra optical loss in the lasing path. A solid-state gain element 108 with the hole 108 will have more induced strain in the lasing path for a given applied force compared to a solid-state gain element 108 without the hole 126. Thus, advantageously a solid-state gain element 108 with the hole 126 will have a larger strain tuning coefficient.

Usefulness for FMCW Lidar

The invention has generally described as a specific embodiment of a µNPRO laser suitable for use in gravity wave detection using a spaced based interferometer; however, embodiments and applications of a µNPRO laser are not so limited.

In particular, a µNPRO laser may be use in a FMCW LIDAR system. In a typical FMCW LIDAR measurement, the frequency is modulated to create a triangle wave, such as that of FIG. 8. A return signal reflected off a target may be heterodyned against the outgoing signal. This creates a beat frequency which indicates the distance to the target.

Figure 11:
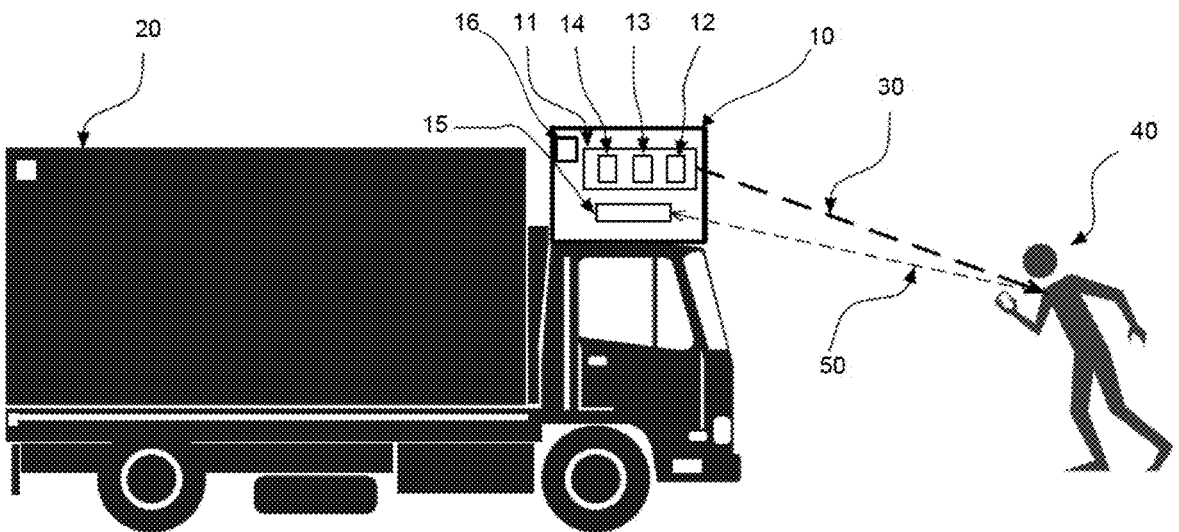
FIG. 11 is a schematic diagram of an exemplary laser ranging system using a NPRO or μNPRO laser.

FIG. 11 shows a representative laser ranging (LIDAR) system 10 according to an embodiment of the present invention. The ranging system 10 may be mounted on a platform 20, such as a vehicle. The vehicle may be under human control or may be autonomous or semi-autonomous. The platform 20 and ranging system 10 may operate in an open environment, from which wildlife and humans are not excluded, such as a roadway. The platform 20, such as a truck or automobile operating at freeway speeds, needs to get useful range data at distances exceeding 1000 feet. If the vehicle is traveling at 70 mph, the time to travel 1000 feet is less than 10 seconds. The ranging system 10 includes a laser 11. The laser 11 may be a µNPRO laser. The laser 11 includes a gain element 13 which may have as its active dopant neodymium ions or some other ion capable of lasing. The lasing wavelength may be a in a wavelength window in an eye-safe wavelength range between approximately 1.2 and 1.6 microns, especially a wavelength range between approximately 1.2 and 1.4 microns. Power to pump the gain element 13 may be provided by a semiconductor laser 14. The semiconductor laser may operate in a continuous manner or the pump power delivered to the gain element 13 may be varied as desired. The laser 11 emits an output beam 30 in the wavelength range from 0.9 µm to 2.2 µm, but preferably emits an output beam in the wavelength range from 1.2 to 1.6 µm. The laser ranging system 10 may include a processor 16 that controls operation of the system and generates ranging information. The processor 16 may be a plurality of processors and controllers, that control operation of the laser ranging system 10 and compile and manipulate data received by the laser ranging system 10.

A monitor 12 may sense emission of the laser 13 and provides a signal indicative of its emission. The target 40 to be measured by the ranging system 10 may include humans with unprotected eyes. Light beam 30 emitted by the laser 11 may strike the target 40 and be scattered and reflected. Some of the scattered and reflected light 50 returns to a detector 15, which may be co-located with the laser 11 within the ranging system 10. The reflected light may return along an optical path identical or close to that of the output laser beam 30. The detector 15 senses the scattered and reflected light and provides a signal. In some embodiments, the monitor 12 and the detector 15 may be a common element.

The laser 11 may operate in a cw manner and its frequency may be scanned. The detector 15 heterodynes the reflected signal 50 with a signal from the laser 11, resulting in a heterodyned beat signal having a frequency representing a difference between the reflected light frequency and the current laser frequency. Since the change in frequency with time is known, the transit time between the laser and target and back is known. Again, using the speed of light this allows a distance to the target to be determined.

There may be multiple targets 40 in the field view and the processor 16 may be configured to discern the nature of the different targets in the field of view. Alternatively, the output beam 30 may flood illuminate a large area and spatial resolution is obtained by having multiple detectors that measure the reflected light over different portions of the illuminated area. In other embodiment, the output beam 30 may be arranged as a line source which is scanned in a direction perpendicular to the line of illumination. Any of these illumination methods may be used to produce a point cloud, which is a set of data points in space that represents a distance to reflective surfaces in the field-of-view of the FMCW LIDAR system.

Motion of the target 40 may be determined by comparing the heterodyne frequency on upward and downward scans of the laser frequency. If the target 40 is moving along the direction of the output laser beam 30 a reflected signal from the target will be frequency shifted due to the Doppler effect. By frequency scanning the laser 11 in an upward direction and downward direction a difference in the frequency of the heterodyne signal between the upward and downward scan can be determined. This frequency difference can be used to determine a speed the target 40 is moving toward or away from the platform.

It should be also appreciated that any of the methods or operations described herein may be stored in a suitable computer readable medium in the form of executable computer code. The executable computer code can be stored in a memory that can include a non-transitory computer-readable medium on which instructions for performing all the methods and functions disclosed can be stored. The term "non-transitory computer-readable medium" can include a single medium or multiple media that store instructions and can include any mechanism that stores information in a form readable by a computer, such as read-only memory (ROM), random-access memory (RAM), erasable programmable memory (EPROM and EEPROM), or flash memory.

The operations are carried out when the processor 16 executes the computer code. The processor 16 may determine a distance between the platform 20 and the target 40. The processor 16 may cause a cw laser 11 mounted on the platform 20 to scan its output frequency. The processor 16 may use a detected frequency difference between a current laser frequency and a frequency of a reflected signal from the target 40 to determine distance to the target 40 and target motion.

Aside from the basic functionality of determining target distance and motion, the processor 16 may also include logic that can discriminate between reflected signals from the target 40 and background noise that may be present in the environment. For example, other laser ranging systems may be in the vicinity and may be emitting laser beams at substantially the same wavelength. The processor 16 may be configured to identify these background signals and disregard them. The processor 16 may also direct the laser 11 to operate with different output characteristics, such as a different center frequency, a different scanning rate, or to scan over a different frequency range. Varying the characteristics of the output beam 30 in a controlled manner may form a code that helps to discriminate against background noise. Different methods of changing the laser output parameters are described herein. These methods may include controlling a resonator optical path length using a steady state offset in the piezo-electric tuning element, controlling the laser 11 temperature, and controlling the laser 11 output power by controlling pumping power to the laser.

The ideal source for FMCW LIDAR may have the following characteristics:

High power at an eye-safe wavelength.

Large depth of modulation. This determines the spatial resolution. With modulation depth of 3 GHz, a spatial resolution of a few centimeters is possible.

Fast modulation with high linearity. This determines the data rate. With a 10 kHz modulation frequency, 10,000 measurements per second can be made with a maximum useful range of about 10 km.

Narrow linewidth.

The LISA μNPRO operates at 1064 nm. At this wavelength enormous power is possible due to amplification, but eye safety is problematic for terrestrial applications. μNPRO lasers can also operate at eye-safe wavelengths near 1.3 microns. μNPRO lasers using Nd:YAG can operate at a lasing wavelength of either 1319 nm or 1338 nm by using an appropriate optical coating on the output facet. The 1.3 micron NPRO laser will have a power of about 60% of what is available at 1064 nm. The output of the 1.3 micron NPRO laser may also be amplified, but not as conveniently as that of a 1064 nm NPRO lasers. Commercial NPRO lasers at 1319 nm have power up to 0.5 watts. The 1319 nm and 1338 nm wavelength are both in a range at which light is the least hazard to the eye, as evidenced by the more permissive Class 1 allowable power.

Figure 12:
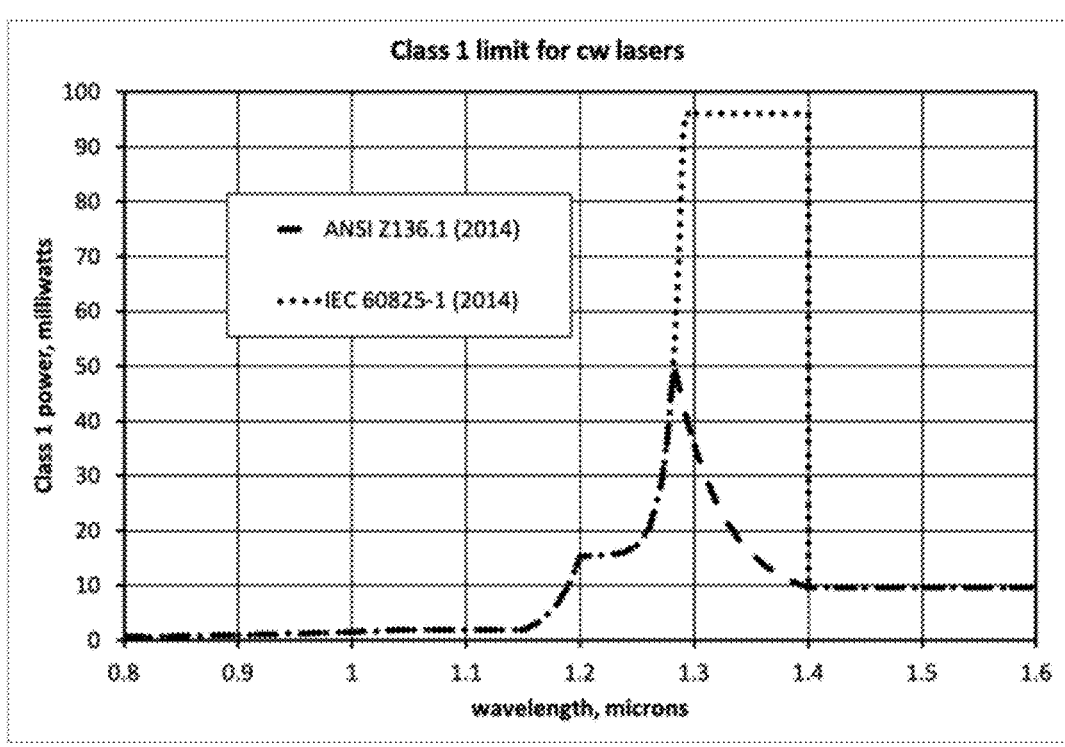
FIG. 12 is a is a plot of an allowable average power vs. wavelength for a Class 1 (eye-safe) laser.

FIG. 12 shows the standard for a Class 1 "eye-safe" laser power as function of wavelength for a laser with a small, collimated beam. The wavelength range between 1.2 and 1.4 μm is the range of greatest allowable power, because water absorption is enough to protect the retina, while not so much that absorbed power is concentrated right at the surface. The two standards agree at all wavelengths except the range from 1280 nm to 1400 nm. In this range, the ANSI standard is stricter.

Figure 13:
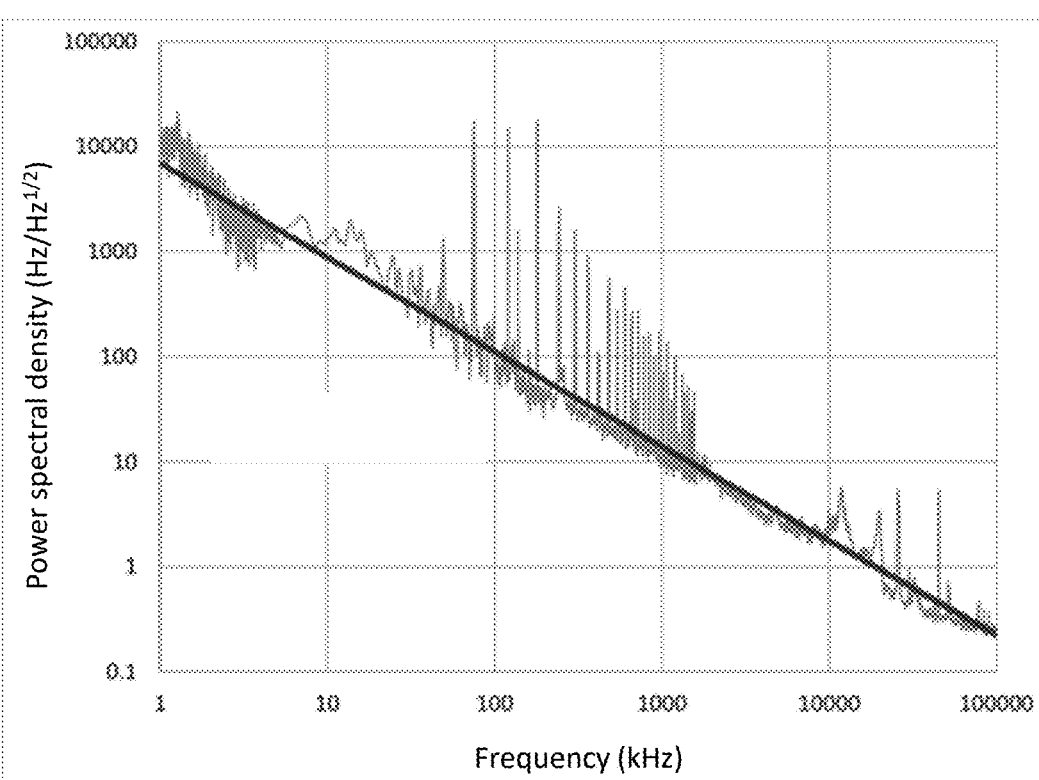
FIG. 13 is a graph of the measured power spectral density of the frequency fluctuations of a representative μNPRO according to an embodiment of the current invention.

The NPRO design results in the narrowest linewidth of any laser type. One way to characterize linewidth is as a power spectral density, in units of Hertz/Hertz$^{1/2}$. FIG. 13 plots that performance measure for a μNPRO. The data has many spikes, which are an instrumentation artifact. The data is well-fit by a function that declines as 1/frequency. At 10 kHz the power spectral density of the frequency fluctuation is 1.77 Hertz/Hertz$^{1/2}$. This is a typical value for commercial NPROs. A measurement done in 0.1 msec will have roughly a 10 kHz effective bandwidth so the frequency fluctuation in 0.1 msec is roughly 1.77 Hertz/Hertz$^{1/2}$·$\sqrt{10}$ kHz=177 Hertz. This makes a negligible contribution to the error of a LIDAR measurement.

The combination of high power, narrow linewidth, fast, broad tunability and (at 1319 nm an eye-safe wavelength) makes the μNPRO, an attractive option for long-range FMCW LIDAR or other applications where frequency agility is needed. Another advantage of the μNPRO laser in FMCW LIDAR applications is that no optical isolator may be needed in the path of the μNPRO laser output beam, since the μNPRO has immunity to small amounts of feedback. μNPROs can be produced in large batches at high yield, and while they will never as inexpensive as lasers using solid-state gain elements in the shape of a rectangular parallelepiped, the cost should not be prohibitive when high performance is needed.

As noted earlier, the μNPRO laser can have a much higher low-frequency strain tuning coefficient, >10 MHz/Volt, than prior art NPRO lasers. The high strain coefficient may allow the μNPRO laser to be driven at low voltages in FMCW LIDAR applications. For example, the drive voltage could be between 0 to 5 Volts, between −12 to +12 Volts, or between −15 to +15 Volts. Such voltages are readily available in common digital and analog electronic systems. If large frequency modulation is required, higher drive voltages may be obtained by using a step-up transformer to drive the piezo-electric element.

An attribute of any piezo-electric material is that it may be depoled if an excessively high electric field is applied across the piezo-electric material. Depending on the type of piezo-electric material and a duration and orientation of the applied electric field a depoling field may be in the range of approximately 100 to 1000 V/mm. Since depoling of the piezo-electric material would compromise its performance, operating voltages of a μNPRO laser must remain below the depoling field. This may limit the span of any frequency modulation of the μNPRO laser. The large low-frequency strain tuning coefficient of a μNPRO laser enables larger frequency modulation spans than prior art NPROs. Operating at a resonance may enable an even larger span of frequency modulation. For example, the span of frequency modulation may be greater than 50%, 60%, 70%, 80%, or 90% of the free spectral range of the μNPRO laser. For the solid-state gain element depicted in FIG. 7, the free spectral range is approximately 13 GHz, so the span of frequency modulation may be greater than approximately 5 GHz, which is greater than the span of the frequency modulation in prior art NPROs.

Figure 9:
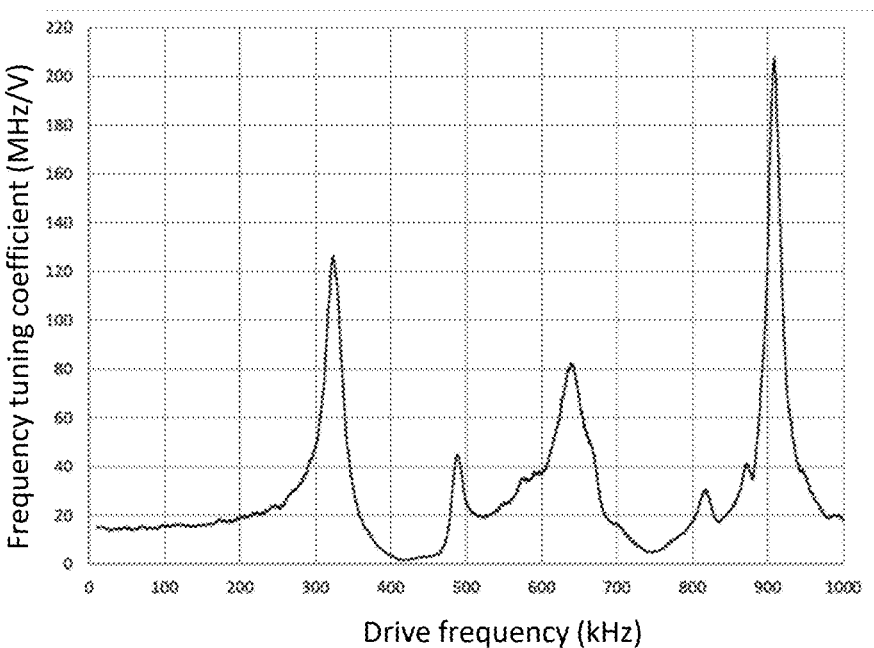
FIG. 9 is a graph showing a measured piezo-electric element response as a function of frequency according to an embodiment of the current invention.
Figure 10:
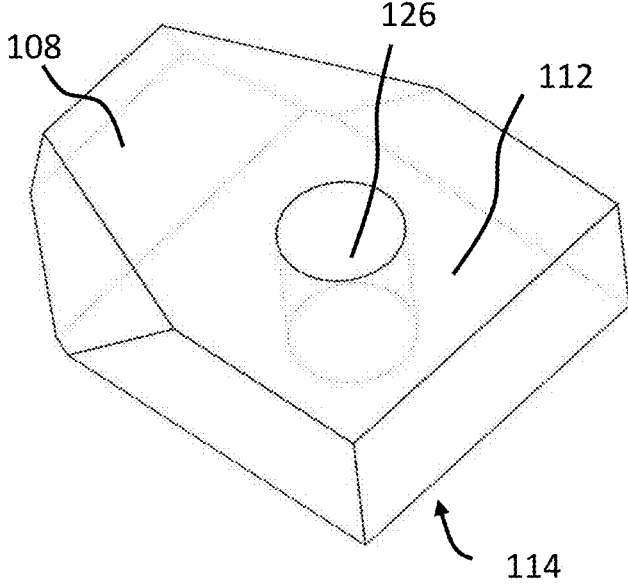
FIG. 10 shows a μNPRO monolithic resonator with a hole according to an embodiment of the current invention.

An approach for obtaining large frequency modulation of the output laser beam using low or modest drive voltages is to drive the piezo-electric element with a signal waveform having a frequency at or near a resonance, such as one of the resonances shown in FIG. 9. This will increase the frequency modulation depth for a given drive voltage. A disadvantage to operating at resonance is that it will be much easier to produce a sinusoidal modulation than any other modulation waveform. While a saw-tooth or triangle wave is the standard modulation waveform for FMCW LIDAR, a sinusoidal modulation is also possible at the cost of more complex signal processing. Since much of the signal processing may be done in software it may be relatively inexpensive to implement making sinusoidal modulation effective and economical.

In summary, one aspect of the invention is a frequency-modulated, continuous-wave laser ranging system. The laser ranging system includes a μNPRO laser, a detector, and a processor. In some embodiments, an output lasing frequency of the μNPRO laser may be modulated at a frequency corresponding to a resonance of the μNPRO laser. In some embodiments, the laser ranging system is used to generate a point cloud, which is a set of data points in space that represents a distance to reflective surfaces in the field-of-view of the laser ranging system. In some embodiments the laser ranging system alters output characteristics of the μNPRO laser in response to interference from other LIDAR systems.

Although there has been shown and described the preferred embodiment of the present disclosure, it will be readily apparent to those skilled in the art that modifications may be made thereto which do not exceed the scope of the appended claims. Terms such as top, bottom, horizontal, and vertical are relative to the orientation of the various elements described in the figures and need not describe the orientation of the element in a final product. Use of the μNPRO laser has generally been described for gravitational wave detection and FMCW LIDAR applications, but the applications are not so limited. Other possible applications for the μNPRO laser include optical coherence tomography, remote gas sensing, and remote sensing of wind speed. The latter may be particularly useful to determine upcoming wind speeds striking a wind turbine, so that the wind turbine blades can be properly adjusted. Also, a gain element of the µNPRO has been described as a laser crystal, particularly a garnet, such as YAG or GGG. In other embodiments, the gain element may be any non-birefringent gain element having a non-zero Verdet coefficient, which includes, but is not limited to, neodymium doped glass. The embodiments described in connection with the illustrated embodiments have been presented by way of illustration, and the present invention is therefore not intended to be limited to the disclosed embodiments. Furthermore, the structure and features of each the embodiments described above can be applied to the other embodiments described herein. Accordingly, those skilled in the art will realize that the invention is intended to encompass all modifications and alternative arrangements included within the spirit and scope of the invention, as set forth by the appended claims.

What is claimed:

1. A laser assembly having an adjustable output frequency comprising:
 a solid-state gain element having four reflective facets, a top face, and a bottom face, wherein the four reflective facets define a nonplanar ring lasing path that lies entirely within the solid-state gain element, wherein the nonplanar ring lasing path defines a first lase plane and a second lase plane; and
 a piezo-electric element bonded to the top face of the solid-state gain element, wherein a distance between the first lase plane and the top face is selected from a group of distances of less than 40%, 30%, 20%, 15% and 10% of a thickness of the solid-state gain element.

2. The laser assembly as recited in claim 1, wherein a distance between the first lase plane and the top face is selected from a group of distances of less than 100, 200, 300, and 400 microns.

3. The laser assembly as recited in claim 1, wherein a thickness of the piezo-electric element is selected from a group of thicknesses of less than 0.5, 0.4, 0.3, or 0.2 mm.

4. The laser assembly as recited in claim 1, wherein the nonplanar ring lasing path surrounds a hole in the solid-state gain element.

5. The laser assembly as recited in claim 1, wherein the laser assembly has a low-frequency strain tuning coefficient larger than 10 MHz/volt.

6. The laser assembly as recited in claim 1, wherein an output laser wavelength is an eye-safe wavelength between 1.2 and 1.4 microns.

7. The laser assembly as recited in claim 1, wherein the piezo-electric element does not overhang the solid-state gain element.

8. A frequency-modulated, continuous-wave laser ranging system comprising:
 a laser assembly as recited in claim 1, wherein a lasing output frequency is frequency modulated by application of a drive voltage to the piezo-electric element;
 a detector; and
 a processor.

9. The frequency-modulated, continuous-wave laser ranging system as recited in claim 8, wherein the drive voltage has a signal waveform having a frequency at a resonance frequency.

10. The frequency-modulated, continuous-wave laser ranging system as recited in claim 8, wherein the drive voltage is a triangle wave.

11. The frequency-modulated, continuous-wave laser ranging system as recited in claim 8, wherein the drive voltage supplied to the piezo-electric element is selected from a group of drive voltages of between 0 to 5 Volts, −12 Volts to +12 Volts, and −15 Volts to +15 Volts.

12. The frequency-modulated, continuous-wave laser ranging system as recited claim 8, wherein the frequency-modulated, continuous-wave laser ranging system does not use an optical isolator.

13. The frequency-modulated, continuous-wave laser ranging system as recited in claim 8, wherein the processor is configured to generate a point cloud.

14. The frequency-modulated, continuous-wave laser ranging system as recited in claim 8, wherein the frequency-modulated, continuous-wave laser ranging system alters an output characteristic of the laser assembly in response to interference from another laser ranging system.

15. A frequency-modulated, continuous-wave laser comprising:
 a laser assembly as recited in claim 1, wherein a lasing output frequency is frequency modulated by application of a drive voltage to the piezo-electric element and a span of the frequency modulation is greater than 50% of a free spectral range of the solid-state gain element.

16. A laser assembly having an adjustable output frequency comprising:
 a solid-state gain element having a length, thickness and four reflective facets, a top face, and a bottom face, wherein the four reflective facets define a nonplanar ring lasing path that lies entirely within the solid-state gain element, wherein the nonplanar ring lasing path defines a first lase plane and a second lase plane; and
 a piezo-electric element bonded to the top face of the solid-state gain element, wherein a distance between the first lase plane and the top face is selected from a group of distances of less than 100, 200, 300, and 400 microns, wherein a ratio of the thickness to the length is greater than 30% so as to increase a frequency of a first mechanical resonance.

17. The laser assembly as recited in claim 16, wherein the laser assembly has a low-frequency strain tuning coefficient larger than 10 MHz/volt.

18. The laser assembly as recited in claim 16, wherein a thickness of the piezo-electric element is selected from a group of thicknesses of less than 0.5, 0.4, 0.3, or 0.2 mm.

19. The laser assembly as recited in claim 16, wherein the nonplanar ring lasing path surrounds a hole in the solid-state gain element.

20. The laser assembly as recited in claim 16, wherein an output laser wavelength is an eye-safe wavelength between 1.2 and 1.4 microns.

* * * * *